Oct. 6, 1970  E. E. LAMBERT  3,533,059

ANTI-COLLISION LIGHT FOR AIRCRAFT

Filed Nov. 8, 1968  3 Sheets-Sheet 1

EDWARD E. LAMBERT
INVENTOR.

BY
Rudolph J. Junick
ATTORNEY

Oct. 6, 1970     E. E. LAMBERT     3,533,059
ANTI-COLLISION LIGHT FOR AIRCRAFT
Filed Nov. 8, 1968     3 Sheets-Sheet 3

EDWARD E. LAMBERT
INVENTOR.

BY
Rudolph J. Lunick
ATTORNEY

United States Patent Office 3,533,059
Patented Oct. 6, 1970

3,533,059
ANTI-COLLISION LIGHT FOR AIRCRAFT
Edward E. Lambert, 437 Leewood Ave.,
Beachwood, N.J. 08722
Filed Nov. 8, 1968, Ser. No. 774,365
Int. Cl. G08g 5/04
U.S. Cl. 340—25                                    9 Claims

ABSTRACT OF THE DISCLOSURE

A pair of light sources are disposed in a housing, one light source having associated therewith light beam control means to provide a 360° circular light beam of relatively narrow width. The other light source is positioned to provide a nearly spherical light beam extending over a relatively large solid angle limited only by the shadow of its own base. The light sources are alternately energized at a predetermined frequency.

Background of the invention

The invention relates to an anti-collision light for aircraft. Blinking lights are required on most aircraft flying at night or under conditions of limited visibility. Most lights have a single light source and while they serve as a warning to pilots of approaching aircraft they provide no indication of the relative altitude of the two aircrafts. A pilot has great difficulty determining the vertical clearance between two aircrafts, particularly when no clear horizon is visible. One arrangement directed to the solution of this problem comprises a rotating beacon having two, constantly-energized lamps associated with separate optical systems to provide wide and narrow light beams. Only the wide beam is visible from an approaching aircraft flying at a level above or below the narrow beam, whereas alternate wide and narrow beams are visible when the approaching aircraft is at a level defined by the narrow beam. This type of anti-collision light is expensive, of large size, and involves moving parts which generally is objectionable. Furthermore, to provide beams of high intensity, the continuously energized light sources are an objectionable drain on the power system of light aircraft.

An anti-collision light made in accordance with this invention is of simple, economical construction, of small size, includes no moving parts and produces brilliant light beams with a minimum drain on the power supply.

Summary of the invention

A pair of xenon gas filled tubes are positioned one above the other in a housing having a dome-shaped, transparent cover. The lower tube is disposed within aligned central openings formed in a stack of closely-spaced surrounding plates which restrict the light rays emerging from the housing to a 360° circular beam of light of relatively narrow width when taken in a plane normal to that of the plates. The upper tube is disposed within the upper portion of the cover and above an opaque plate positioned at the top of the baffle, the light rays from this tube forming a nearly spherical light beam extending over a large solid angle. The tubes are energized, alternately, at a predetermined frequency. When the light is mounted on an aircraft, only brilliant flashes of light from the upper tube, at the predetermined frequency, are visible from another aircraft flying at a level above or below the angular spread of the light beam emerging from the lower tube. When the observing aircraft lies within the angular spread of the light beam emerging from the lower tube, brilliant light flashes of double frequency will be visible, thereby serving as a warning the observing aircraft may be flying at or near the same altitude.

An object of this invention is the provision of an improved anti-collision light for aircraft, which light is constructed and arranged to aid pilots in determining the relative levels of two aircraft.

An object of this invention is the provision of an aircraft anti-collision light providing alternate, brilliant light flashes, only one of the light flashes being visible from a distant point lying above or below a predetermined angle taken with reference to the flight path of aircraft carrying the light, and both flashes being visible from a distant point lying within such predetermined angle.

An object of this invention is the provision of an aircraft anti-collision light having alternately energized xenon gas filled tubes disposed within a housing, the light rays emanating from the one tube passing through a planar light beam control and emerging from the housing as a circular beam of light of relatively small angular spread, and the light rays emanating from the other tube emerging from the housing as a nearly spherical beam of light having a relatively large angular spread, both said angles being taken with reference to the plane of the said light beam control.

The above-stated and other objects and advantages of the invention will become apparent from the following description when taken with the accompanying drawings. It will be understood, however, that the drawings are for purposes of illustration and are not to be construed as defining the scope or limits of the invention, references being had for the latter purpose to the claims appended hereto.

BRIEF DESCRIPTION OF THE DRAWINGS

In the drawings wherein like reference characters denote like parts in the several views.

Description of the preferred embodiments

Figure 1:
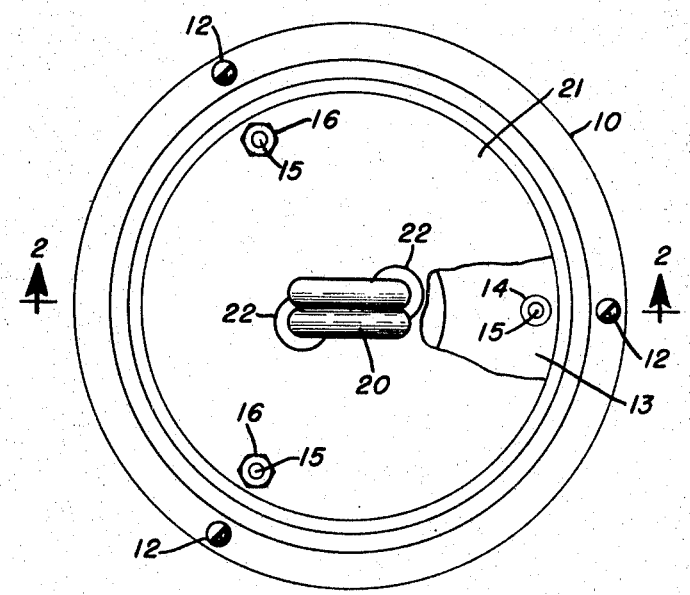
FIG. 1 is a top plan view of an aircraft anti-collision light made in accordance with this invention, with a portion of the upper opaque disc broken away.
Figure 2:
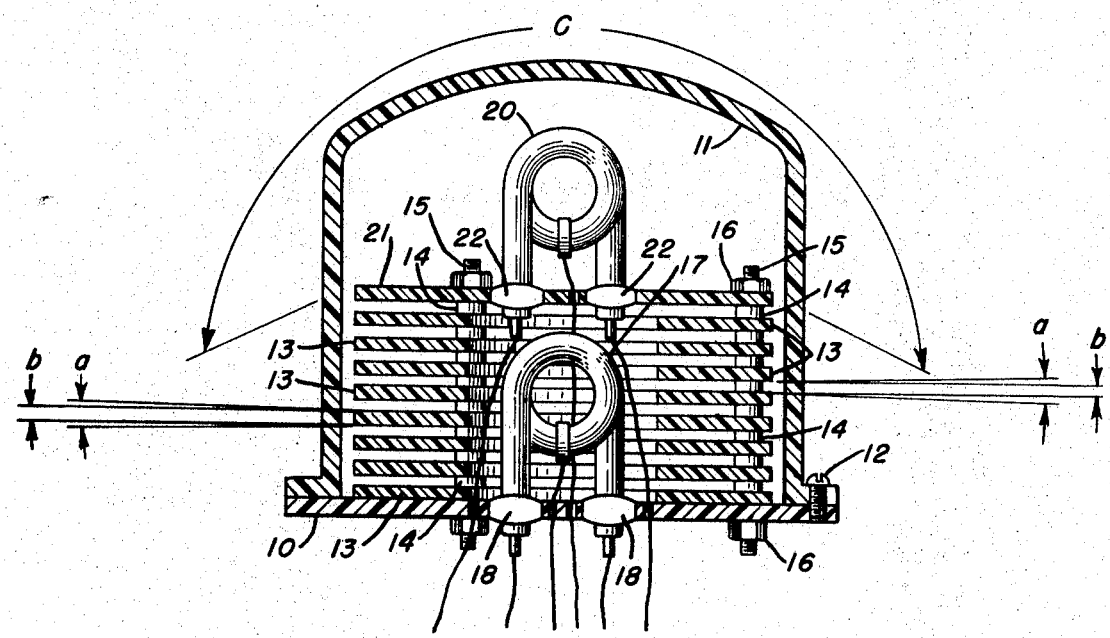
FIG. 2 is a vertical cross-sectional view taken along the line 2—2 of FIG. 1.
Figure 4:
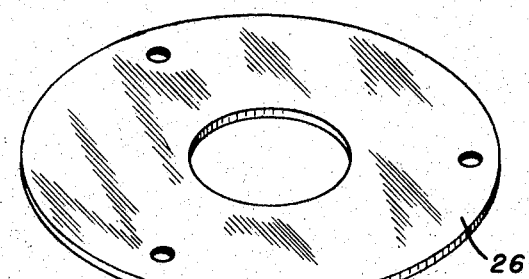
FIG. 4 is an isometric view showing one plate of a light beam control made in accordance with another embodiment of the invention.

Reference now is made to FIGS. 1 and 2, wherein there is shown an opaque circular base plate 10, made of suitable non-conducting material such as a plastic, and having a dome-shaped, transparent cover 11 made of a clear plastic or glass, secured thereto by means of the screws 12. A plurality of flat plates 13 and spacers 14 are assembled to the base by means of the threaded rods 15 and cooperating nuts 16, said plates having central openings formed therein to provide a chamber for the lower xenon gas-filled tube 17. The legs of this tube pass through openings formed in the base 10 and are secured in place by a flexible cement identified by the numerals 18. The flat plates 13, made of a clear plastic, have their flat surfaces roughened and coated with a dull non-reflecting coating while the peripheral surfaces thereof are polished. The stack of plates constitutes a light beam control for the tube 17, light rays from the tube passing through the individual plates and through the intervening spaces and emerging from the cover 11 in a horizontal, 360° beam of light having a vertical angle of divergence determined by the diameter and thickness of the individual plates and the spacing therebetween. When viewed in a plane normal to that of the plates, the emerging light beam has a total angular spread represented by the angle $a$, FIG. 2, but over a somewhat smaller angle $b$ the light rays will have a maximum brilliance. In any event, the light beam emerging from the plate assembly will be visible from a distant point only when the position of the viewer lies within the angle $a$. The light beam control may be formed of a plurality of metal plates, such as the plate 26 shown in FIG. 4. In this case the angles $a$ and $b$ are determined by the spacing between the plates.

The upper, xenon gas-filled tube 20 has legs passing through openings formed in an opaque mounting plate 21 and is secured in place by means of flexible cement identified by the numeral 22, said plate being secured to the stack and serving also as a light shield for optically isolating the two tubes within the housing. Alternatively, both of the tubes 17 and 20 may be mounted on the plate 21, the lower tube 17 being inverted and rotated 90° so that the individual legs of the two tubes will pass through openings spaced apart by 90 degrees. In either arrangement, light rays from the tube 20 emerge from the housing as a brilliant, nearly spherical light beam having an angular spread represented by the angle $c$ when taken from a point lying in any plane normal to that of the mounting plate. Leads from the electrodes of the gas-filled tubes pass through spaced holes provided in the base plate 10, as shown. When energized, the tubes produce a brilliant burst of light visible from great distances even under relatively poor light propagating conditions. Such burst of light is of very short duration, thereby minimizing the drain on the power system of the aircraft.

Figure 3:
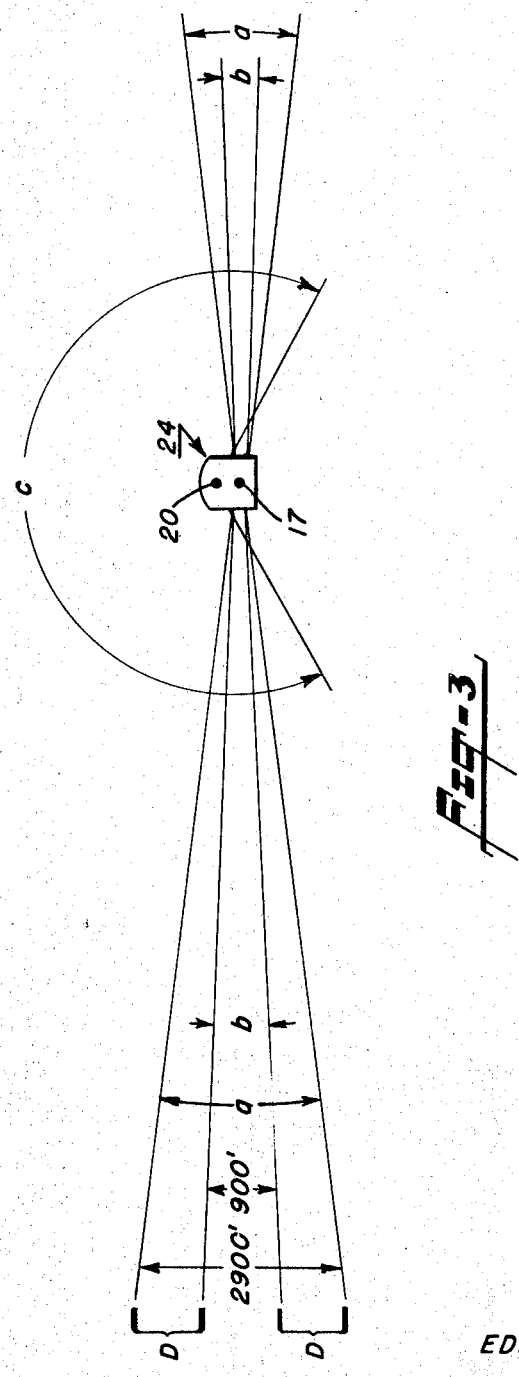
FIG. 3 is a diagrammatic representation showing the relative angular spread of the two light beams and the vertical zones within which one or both light beams are visible when viewed at points remote from the light.

Reference now is made to the diagrammatic representation of FIG. 3, wherein the above-described light light is identified by the numeral 24 and is assumed to be mounted on an aircraft in flight. The nearly spherical light beam emanating from the tube 20 has a vertical angular spread shown by the angle $c$ and such light beam will be visible from another aircraft flying at any level within the zone defined by the angle $c$. On the other hand, the controlled light beam emanating from the lower tube 17 will be visible to the pilot of another aircraft only when such aircraft is flying at a level within the vertical zone defined by the angle $a$. The two vertical zones lying outside of the angle $b$ but within the angle $a$ will be referred to as fringe zones as the light beam within these zones has an obviously apparent lower intensity than that of the beam within the angle $b$.

The light beam control is so constructed that at a distance of some three miles, the vertical height encompassed by the angle $a$ is approximately 2,900 feet and that encompassed by the angle $b$ is approximately 900 feet. With the tubes 17 and 20 alternately energized 60 times per minute, the pilot of an approaching aircraft flying at a level falling within the zone defined by the angle $c$ but exclusive of the zone defined by the angle $a$ will see only the light flashes emanating from the tube 20 at a frequency of one cycle per second, thereby indicating a safe vertical distance between the aircrafts. If the approaching aircraft is flying at a level falling within the zone defined by the angle $b$, the pilot will see light flashes of substantially equal brilliance occuring at double frequency, namely, two cycles per second, thereby indicating he may be flying on a collision course or at least at a dangerous level. If the approaching aircraft is flying at a level falling within either of the zones identified by the brackets D and D', the pilot will see alternate bright and dim light flashes occuring at a rate of two cycles per second, thereby indicating a change in level of the approaching aircraft may be desirable. As the distance between the two aircraft is reduced, the vertical distances shown in the drawing will be decreased correspondingly. However, the light flashes normally will be visible from distances far exceeding three miles so that the pilot of the observing aircraft will be made aware of an unsafe flying level in ample time to take corrective action even in the case of high speed jet aircraft, as the light flashes produced by the xenon type lamp can be seen up to a distance of 50 miles.

Since the anti-collision light produces flashes extending over a full 360 degrees in a horizontal plane, it will be apparent that such flashes will be visible from any point lying in any vertical plane containing a vertical line through the two tubes provided, of course, that the line of sight between any such point and the light is not obstructed by parts of the aircraft upon which the light is mounted. From a practical standpoint a single anti-collision light mounted on the tail of a small aircraft will serve the intended purpose. In the case of large aircraft it may be preferable to employ two lights mounted on the top and bottom of the fusilage, with corresponding tubes of each light energized simultaneously. From any appreciable distances the physical separation of the two light sources will be immaterial as the light flashes will appear as emanating from a single source.

Figure 5:
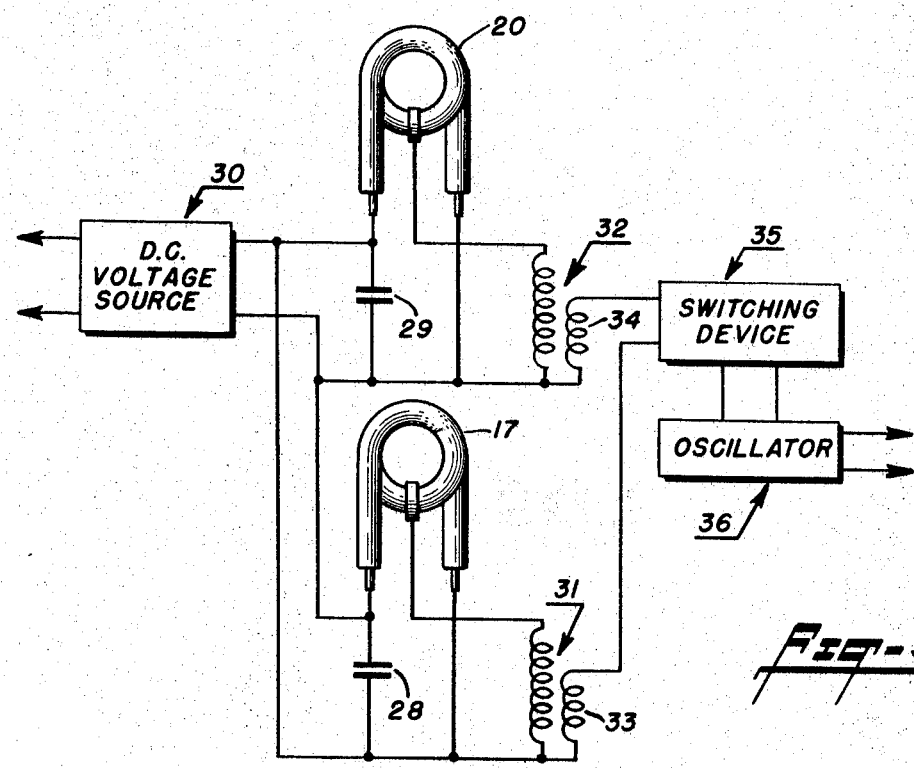
FIG. 5 is a schematic diagram of a circuit for alternately energizing the two light sources.

A conventional capacitor discharge circuit may be used for energizing the gas-filled tubes, one such circuit being shown in the schematic diagram of FIG. 5. The capacitors 28 and 29 are connected across the anode and cathode electrodes of the respective gas-filled tubes 17 and 20, and are charged by a relatively high D.C. voltage from a source 30. The voltage of the charged capacitors is not sufficient to effect a gaseous discharge within the tubes. The trigger electrodes of the tubes 17 and 20 are connected to the secondary windings of the respective step-up trigger transformers 31 and 32. Momentary triggering impulses are applied alternately to the secondary windings 33 and 34, at a rate of 60 pulses per minute, by a flip-flop switching device 35 controlled by the oscillator 36. Upon application of the triggering impulses to the tubes, the energy stored in the capacitors 28 and 29 is delivered to the associated tube producing a brilliant discharge therein.

Having now described the invention those skilled in this art will be able to make various changes and modifications without thereby departing from the scope and spirit of the invention as recited in the following claims.

I claim:

1. In an aircraft anti-collision light of the class having two light sources disposed within a housing, the improvement wherein the light sources are alternately energized gas-filled tubes, wherein the light rays emanating from the one tube emerge from the housing as a nearly spherical light beam extending over a large solid angle, and wherein the light rays emanating from the other tube pass through spaced plates and emerge from the housing as a circular light beam of narrow width.

2. An aircraft anti-collision light comprising,
 (a) a light-permeable housing,
 (b) a first light source within the housing and positioned to provide a nearly spherical light beam emerging from the housing,
 (c) a second light source within the housing, and
 (d) light beam control means surrounding the second light source to provide a relatively narrow circular light beam emerging from the housing.

3. The invention as recited in claim 2, wherein the said light beam control means comprises a stack of spaced flat plates, and wherein the said second light source is positioned within aligned central openings formed in said plates.

4. The invention as recited in claim 3, wherein the said plates are made of a light-impervious material.

5. The invention as recited in claim 3, wherein the said plates are made of a light-transmitting material and wherein the flat surfaces of each plate are coated with a non-reflecting coating.

6. The invention as recited in claim 2, including means alternately energizing the light sources.

7. The invention as recited in claim 2, wherein the said light sources are xenon gas-filled tubes, and including a light shield positioned within the housing and between the two tubes.

8. The invention as recited in claim 7, in combination with means alternately energizing the two tubes at a predetermined frequency.

9. The invention as recited in claim 2, wherein the housing comprises a base having a transparent, generally dome-shaped cover secured thereto, wherein a light shield is secured in fixed position within said cover, wherein the said first light source is a xenon gas-filled tube having substantially parallel leg portions passing through openings formed in said light shield and secured thereto by a flexible cement, and wherein the second light source is a xenon gas-filled tube having substantially parallel leg portions passing through openings formed in said base and secured thereto by flexible cement.

References Cited

UNITED STATES PATENTS 2,748,371  5/1956  Wilcox et al. _____ 340—25

FOREIGN PATENTS 806,793  12/1958  Great Britain.

KATHLEEN H. CLAFFY, Primary Examiner

J. S. BLACK, Assistant Examiner

U.S. Cl. X.R.

340—87